US005166855A

United States Patent [19]

Turner

[11] Patent Number: 5,166,855

[45] Date of Patent: Nov. 24, 1992

[54] SURGE PROTECTOR WITH THERMAL FAILSAFE

[75] Inventor: Paul Turner, Somerset, England

[73] Assignee: Semitron Industries Ltd., United Kingdom

[21] Appl. No.: 661,216

[22] Filed: Feb. 27, 1991

[51] Int. Cl.[5] .............................................. H02H 3/00

[52] U.S. Cl. .................................... 361/119; 361/124; 361/129; 361/130

[58] Field of Search ............... 361/119, 124, 129, 130; 337/29, 31, 32

[56] References Cited

U.S. PATENT DOCUMENTS 4,007,404 2/1977 Jost et al. ............................ 361/119
4,249,224 2/1981 Baumbach ........................... 361/124
4,538,201 8/1985 Wuyts et al. ........................ 337/140
4,856,060 8/1989 Meyerhoefer et al. ............. 361/119
4,944,003 7/1990 Meyerhoefer et al. ............. 361/119
4,958,253 9/1990 Gilberts et al. ..................... 361/119
5,001,446 3/1991 Tsuji et al. .......................... 337/140

*Primary Examiner*—Steven L. Stephan
*Assistant Examiner*—Thomas M. Dougherty

[57] ABSTRACT

The surge protector includes a device for connecting a transmission line to ground in the event of excess voltage or current, to protect communications equipment. A thermal sensitive element, located proximate the device, provides an independent, permanent path to ground, before the device can heat to a level where it may fail in the open circuit state. The element is a grounded conductive rod of nickel-titanium alloy which has a configuration memory. The rod normally has an arcuate configuration with a portion spaced from the transmission line contact associated with the device. It will assume a straight configuration, connecting the transmission line contact to ground, if the device overheats. Thermal failsafe protection for protective devices associated with ring and tip conductors, respectively, can be provided with a single thermal sensitive element.

12 Claims, 4 Drawing Sheets

SURGE PROTECTOR WITH THERMAL FAILSAFE

The present invention relates to apparatus for protecting telecommunications and data transmission equipment from power surges on transmission lines to which it is connected, and more particularly, to an improved power surge protector which includes a thermal failsafe mechanism for preventing failure of the protector in the open circuit state.

Various types of power surge protectors are known and commonly used to protect sensitive electronic equipment, such as telephone and data communications equipment, from power surges on transmission lines. The protectors are situated near the end of the transmission line to which the equipment is connected and serve to ground the transmission line in the event of voltage or current excesses of sufficient magnitude to damage the equipment.

Solid state and gas tube type devices are commonly used to protect against voltage surges. The solid state devices may include one or more diodes which form a normally non-conducting circuit, that is, one which has a very high output resistance, which becomes conductive in response to voltage exceeding a given level, for example, 260 volts. The gas tube type devices include spaced electrodes forming a gap. The gap is bridged by a spark when excess voltage occurs.

Current sensitive devices are also employed, in many cases, in conjunction with the voltage sensitive devices. Such devices may include a spring loaded element which is moved by the spring to connect the transmission line to ground when excess current is encountered. The element may consist of a wire wound bobbin fixed to a stationary member by a meltable substance such as solder. The solder melts to release the bobbin when the wire heats due to the excess current.

In the conducting state, these devices tend to heat up when exposed to sustained high voltages or currents. After a period of time, they may "burn out", that is, fail in the nonconducting state, creating a permanent open circuit condition. When this occurs, the communications equipment is left unprotected. If the problem is not detected and the protector replaced, the communications equipment is vulnerable to damage by a subsequent power surge.

Although the present invention is described in the context of a particular surge protector, it should not be considered limited to the structure of the voltage and current sensitive devices disclosed. However, it is useful to know that the embodiment of the invention disclosed herein is intended to be an improvement upon the general type of surge protector disclosed in U.S. Pat. No. 4,769,150 issued Jan. 3, 1989 to Dickey et al. and entitled "Telecommunications Protector Unit with Pivotal Surge Protector." The preferred embodiment is described in the context of the protector disclosed in that patent. The reader is referred to that patent and to the patents discussed therein for further details of the protector itself.

The device disclosed in U.S. Pat. No. 4,769,150 suffers from the potential problem of failing in the open circuit condition, as do other prior art devices of this type. If it overheats, it may fail in the open circuit condition, leaving the telecommunications equipment vulnerable to damage from further power surges.

It is therefore a prime object of the present invention to provide a failsafe device for use in a surge protector, which will provide an independent path to ground prior to failure of the protector components in the open state condition.

It is another object of the present invention to provide a surge protector with a thermal failsafe mechanism which is simple and effective.

It is another object of the present invention to provide a surge protection with a thermal failsafe mechanism which includes a thermal sensitive element with a configuration memory.

It is another object of the present invention to provide a single thermal failsafe element capable of functioning in conjunction with voltage and current sensitive devices protecting both the ring and the tip conductors of a dual conductor telephone signal transmission line.

In accordance with one aspect of the present invention, apparatus is provided for protecting communications equipment from power surges on a transmission line. The apparatus comprises first means, normally non-conductive and effective to become conductive, for grounding the transmission line in response to a power surge exceeding a given level. When conductive for a sustained period, the first means will generate heat exceeding a given temperature level, prior to failure in the non-conducting state. Second means are provided for independently grounding the transmission line, in response to sensing a temperature exceeding the given level proximate the first means.

The second means includes a thermal sensitive element adapted to permanently ground the transmission line when the first means heats to a temperature exceeding the given level. This independent ground path will remain, even after the first means cools.

The thermal sensitive element preferably comprises a nickel/titanium alloy having a configuration memory. The element changes from one configuration (i.e. arcuate) to a second configuration (i.e. straight) as the temperature exceeds the given level.

The first means includes a contact connected to transmission line. The thermal sensitive element is grounded and has a portion which is normally spaced from the contact. When the element changes configuration, the normally spaced portion moves to abut the contact. In this manner, the element provides a permanent independent conductive path between the contact and ground.

The first means comprises voltage sensitive means in the form of a solid state surge suppressor or a gas-tube type spark gap surge suppressor. It may also include current sensitive means such as a spring loaded, wire wound bobbin fixed on a stationary member by a meltable substance. The bobbin is moved by the spring, relative to the member, when the substance melts in response to excessive heat generated as current goes through the wire, causing the transmission line to be connected to ground.

The apparatus of the present invention can be adapted for use with a transmission line with dual conductors, such as tip and ring conductors. The first means includes voltage sensitive means having a contact associated with each conductor. The second means includes independently operating devices associated with each of the contacts, respectively.

In accordance with another aspect of the present invention, apparatus is provided for protecting communications equipment from power surges on a dual conductor transmission line. The apparatus comprises power surge detection means having first and second sections. Each section includes voltage sensitive means and current sensitive means and is associated with a different one of the conductors. A ground member is also included. Each of the power surge detector means sections is adapted to connect the associated conductor to the ground member in response to a surge exceeding a given power level on the associated conductor.

Thermal detection means are provided proximate the first and second power surge detector sections. The thermal detection means is adapted to connect the conductor associated with the first power surge detection means section to the ground member in response to sensing a temperature exceeding a given level proximate the first power surge detection means section and is adapted to connect the conductor associated with the second power surge detection means section to the ground member in response to sensing a temperature exceeding said given level proximate the second power surge detection means section.

The thermal detection means includes a thermal sensitive element, having first and second portions aligned with, but normally spaced from, the conductors associated with the first and second power surge detection means sections, respectively. The element is effective, in response to sensing a temperature above the given level proximate one of the power surge detection means sections, to change configuration to connect the conductor associated with that power surge detection means section to the ground member.

The apparatus includes a housing. The power surge detection means sections are situated in the housing on either side of the ground member. Means are provided for spring loading the power surge detection means within the housing.

Each of the current sensitive means sections comprises a wire member normally fixed to a member, stationary with respect to the housing, by a meltable substance. The wire member is moved into contact with the grounding member by the spring means when the meltable substance melts.

The thermal sensitive element is comprised of a nickel/titanium alloy which has a configuration memory. It normally has an arcuate configuration with a central portion connected to the ground member. Each of the two end portions is aligned with, but normally spaced from, a different one of the transmission line conductors associated with the power surge detection means sections. The configuration of the element changes in response to sensing a temperature exceeding the given level proximate one of the power surge detection means sections, such that the portion of the element aligned with that power surge detection means section moves to abut the associated conductor contact.

The ground member is situated within a non-conductive housing. Spring means are interposed between the housing and the grounding member.

To these and such other objects as may hereinafter appear, the present invention relates to a surge protector with a thermal failsafe, as described in the following specification and recited in the annexed claims, taken together with the accompanying drawings, in which like numerals refer to like parts, and in which:

Figure 1:
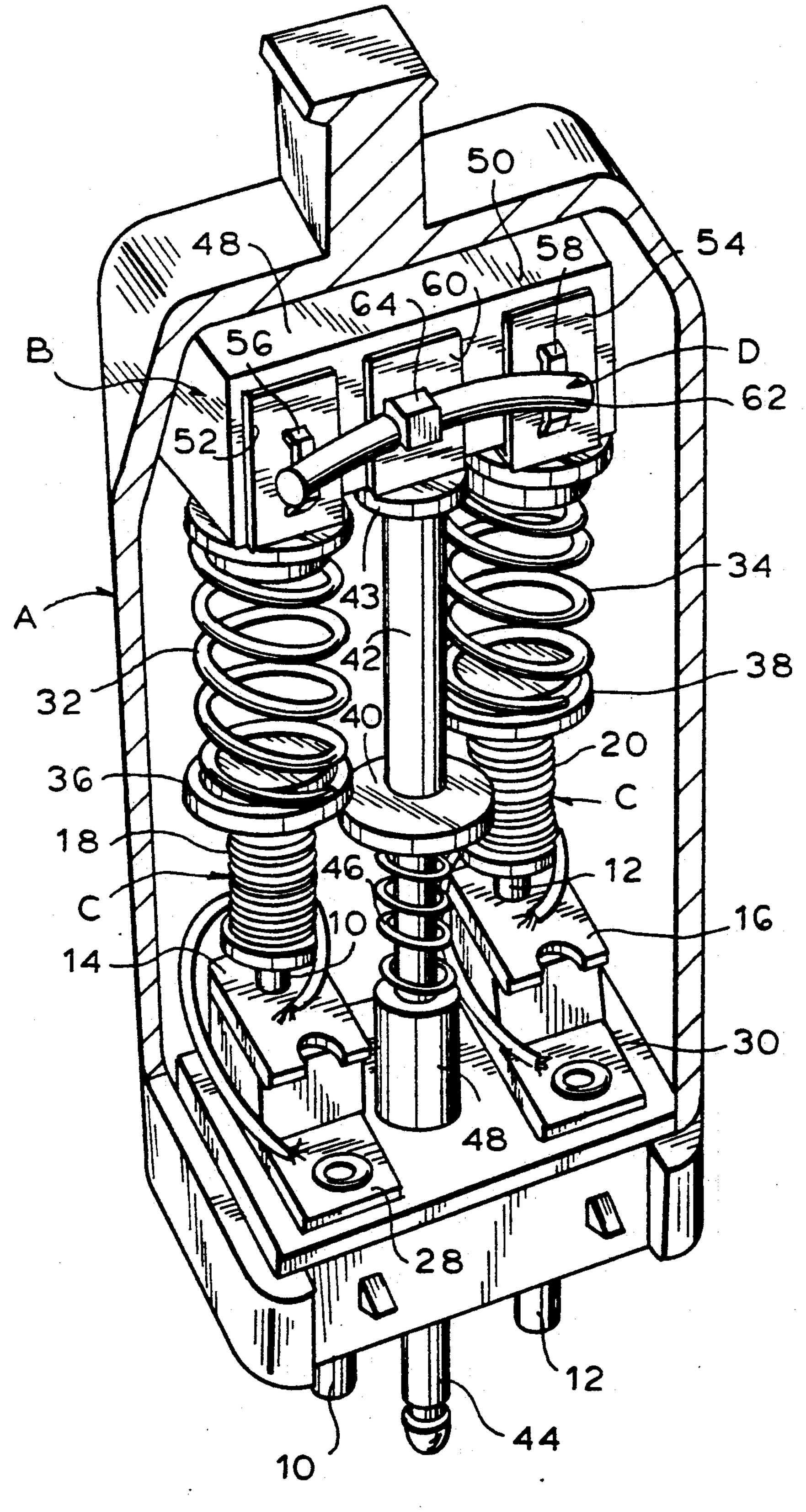
FIG. 1 is an isometric view of the surge protector of the present invention with a portion of the housing cut-away.
Figure 2:
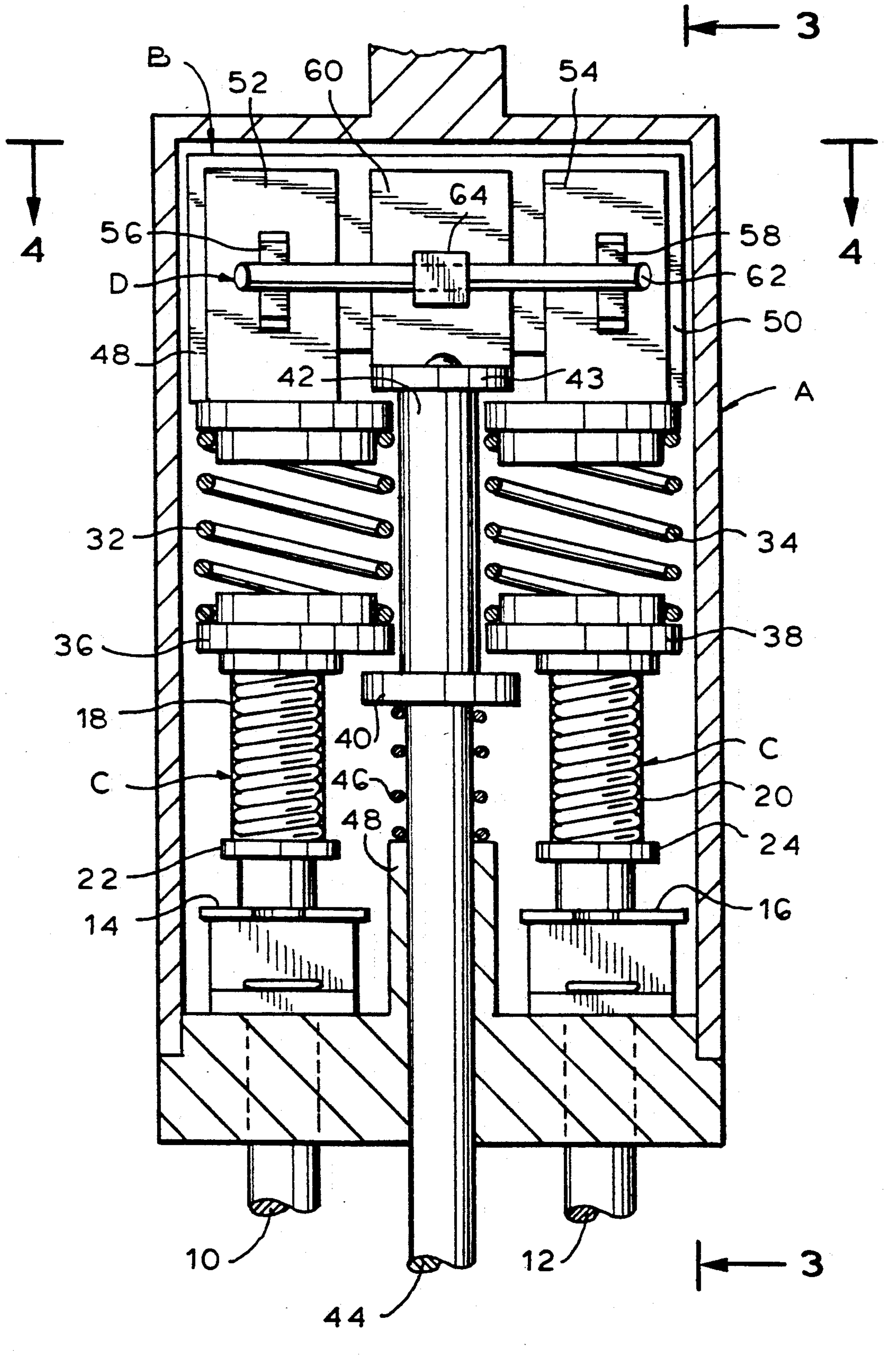
FIG. 2 is a front view of the protector.

As seen in the drawings, the protector of the present invention includes a non-conductive housing, generally designated A. Within housing A are situated a solid state, voltage sensitive device, generally designated B, a pair of current sensitive devices, generally designated C, and a thermal sensitive device, generally designated D.

Figure 5:
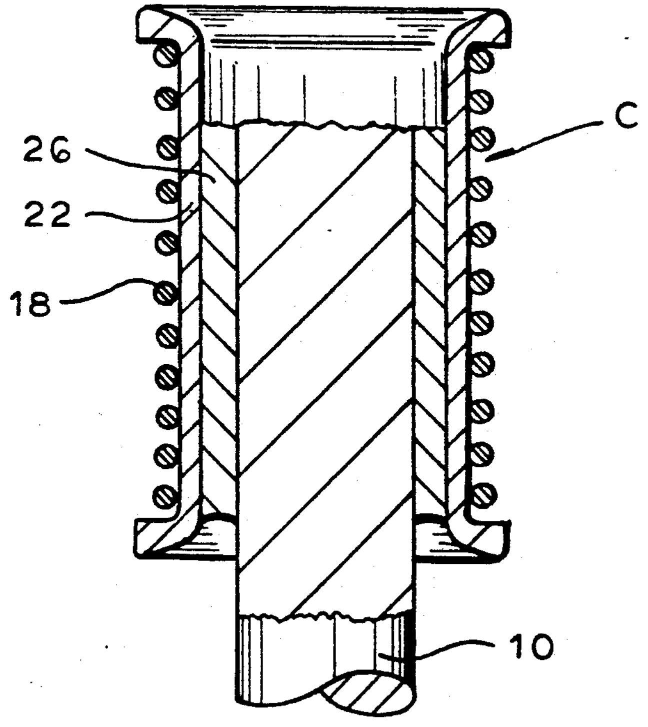
FIG. 5 is a cross-sectional view of one of the bobbin of one of the current sensitive devices of the protector.

Housing A includes transmission line pins 10, 12 one for each of the ring and tip conductors of a dual transmission line. Each line pin 10, 12 is connected to a conductive plate 14, 16, respectively near the bottom of the housing. Each plate 14, 16 is in turn connected to a one end of a different wire coil 18, 20, respectively, wound around a bobbin 22, 24 which is fixedly mounted on pin 10, 12 by a layer of solder 26 (see FIG. 5). The other end of each wire coil 18, 20 is connected to a conductive plate 28, 30 each of which is in turn, connected to a separate central office pin (not shown).

Coils 18, 20 and the bobbins 22, 24 upon which they are mounted, form two independently acting current sensitive devices C. Current from each transmission line conductor normally travels through one of the line pins 10, 12, the connected wire coil 18, 20 and then to one of the central office pins (not shown). When excess current is encountered on one of the lines, the associated wire coil 18, 20 will generate sufficient heat to melt solder layer 26 affixing it to the pin upon which it is mounted. When this occurs, the bobbin 22, 24 will be moved toward the bottom of the housing by the one of the conductive springs 32, 34 interposed between the bobbin and the contact of voltage sensitive device B.

The top of each bobbin 22, 24 carries a conductive disc 36, 38 of larger diameter than the bobbin. Discs 36, 38 are normally situated at a position above and spaced from a conductive disc 40 fixed to a central ground member 42. Member 42 is, in turn, connected to a ground pin 44 which protrudes from the bottom of housing A. A spring 46, situated between disc 40 and cylindrical protrusion 48 on the bottom of housing A, urges ground member 42 towards the top of housing A.

Figure 3:
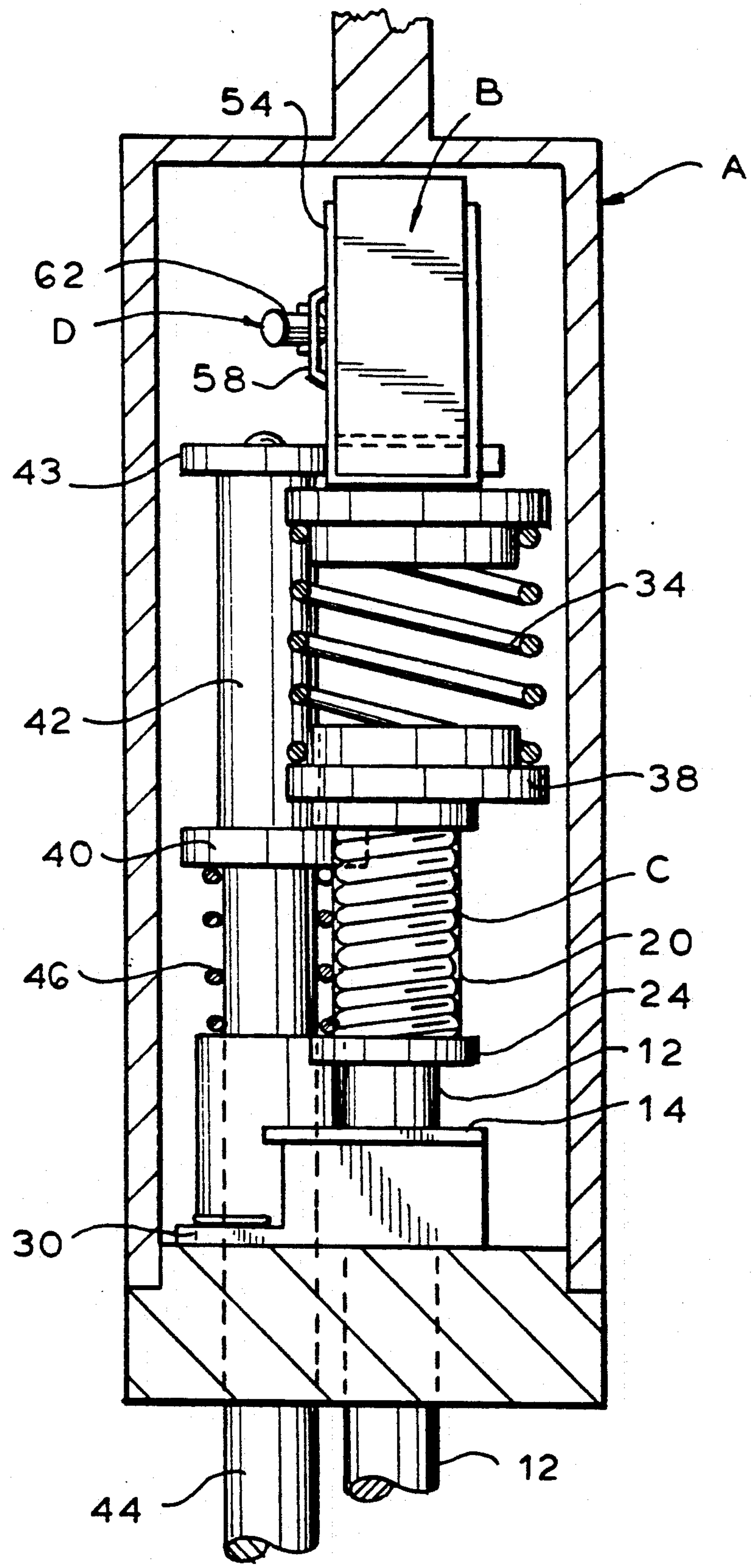
FIG. 3 is a side view of the protector, taken along line 3—3 of FIG. 2.

Melting of solder layer 26 associated with one of the bobbins 22, 24 releases the bobbin to be moved downwardly, relative to the pin 10, 12 upon which it is mounted, by the spring 32, 34 associated with that bobbin (FIG. 3). The disc 36, 38 associated with that bobbin is thus brought into electrical contact with disc 40, carried by ground member 42, grounding the line pin of the conductor of the transmission line associated with that bobbin. This will normally occur in the event of a current surge.

Springs 32 and 34 are conductive and also serve to electrically connect each transmission line pin with different section 48, 50 of voltage sensitive device B. Device B may include a single solid state voltage protective circuit or a separate circuit for each conductor. Springs 32 and 34, as well as spring 46, also serve to maintain voltage sensitive device B in position within housing A.

Each section 48, 50 of voltage sensitive device B is provided with an external conductive plate 52, 54 with a raised contact 56, 58. Plate 52 (and contact 56) are electrically connected to spring 32. Similarly, plate 54 (and contact 58) are electrically connected to spring 34. Ground member 42 is connected to the ground terminal of device B on the bottom surface thereof by a disc 43. Conductive plate 60 on the front of device B is connected to disc 43.

Figure 4:
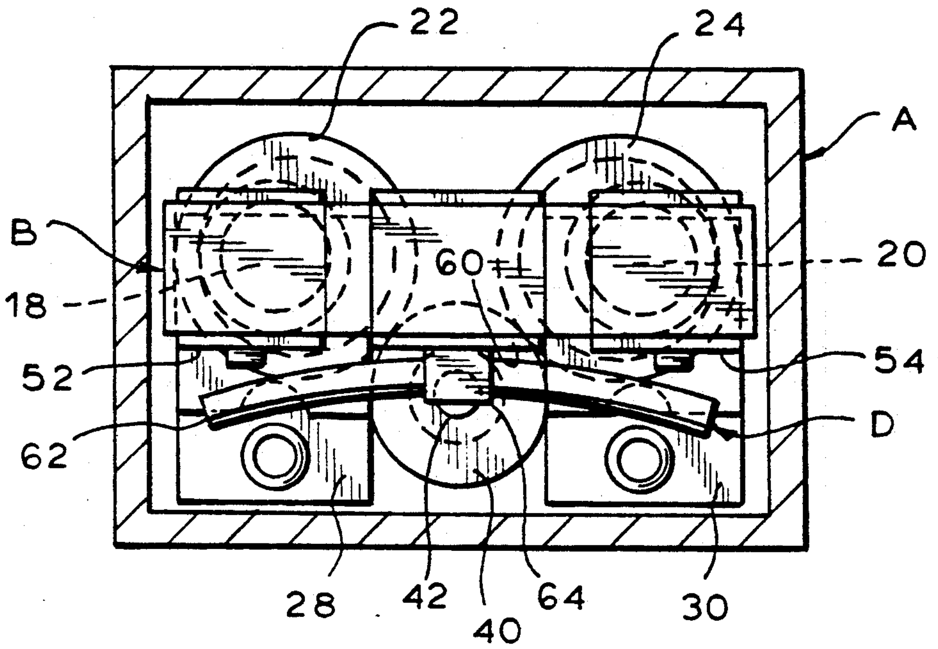
FIG. 4 is a top view of the protector, taken along line 4—4 of FIG. 2.

Thermal sensitive element D comprises a conductive rod 62 composed of a nickel/titanium alloy of known composition which has a configuration memory. With normal operating temperature ranges, rod 62 has an arcuate configuration, as best seen in FIG. 4. The mid section of rod 62 is attached to plate 60 by a crimping member 64 to ground the rod. The ends of rod 62 each align with but, in the normal operating temperature range configuration, are spaced from contacts 56 and 58, respectively.

However, should the temperature of one or both portions of 48, 50 of device B rise above a given level, due to the conducting of energy to ground for a sustained time period, the configuration of the half of rod 62 associated with that heated portion will change to straight, providing an independent path to ground for the associated conductor, regardless of the state of the voltage sensitive device B or the state of current sensitive devices C. The configuration of rod 62 will remain straight regardless of future temperature changes and hence is a permanent path to ground.

The temperature at which thermal sensitive element D changes configuration is set (by choosing the appropriate alloy composition and physical characteristics) at a level substantially below that at which device B or devices C will "burn out" and fail in an open circuit condition. Thus, protection of the communications equipment is always assured by providing a permanent, independent path to ground which is temperature sensitive. This function is performed in an extremely reliable way by means of a simple, nickel/titanium alloy rod with configuration memory.

It should now be appreciated that the present invention is an improved surge protector for telecommunications or data transmission systems which includes a failsafe mechanism which prevents failure in the open circuit condition. The failsafe mechanism includes a thermal detector in the form of a rod composed of an alloy with a configuration memory. The rod abruptly and permanently changes configuration if the protector devices heat beyond a level where they are likely to fail in a non-conductive state. The configuration change creates an independent path to ground, so that the communications equipment is not left exposed to damage from further power surges.

While only a single preferred embodiment of the present invention has been disclosed for purposes for illustration, it is obvious that many variations and modifications could be made thereto. It is intended to cover all of these variations and modifications which fall within the scope of the present invention, as defined by the following claims:

I claim:

1. Apparatus for protecting communications equipment from power surges on a dual conductor transmission line, said apparatus comprising power surge detector means comprising first and second power surge detection means sections, each section including voltage sensitive means, and being associated with a different one of the transmission line conductors, a ground member, each of said first and second power surge detection means sections being adapted to connect the conductor associated therewith to said ground member in response to a surge exceeding a given voltage or current level on the associated conductor and thermal sensitive means located proximate said first and second power surge detection means sections, said thermal sensitive means having first and second portions, said first thermal sensitive means portion being adapted to connect the conductor associated with said first power surge detection means section to said ground member in response to sensing a temperature proximate said first power surge detection means section exceeding a given level, said second thermal sensitive means portion being adapted to connect the conductor associated with said second power surge detection means section to said ground member in response to sensing a temperature proximate said second power surge detector section exceeding a given level and further comprising a non-conductive housing within which said ground member is situated and spring means interposed between said housing and said ground member.

2. The apparatus of claim 1 wherein said thermal sensitive means comprises a thermal sensitive element having first and second portions proximate said first and second power surge detection means sections, respectively and effective, in response to sensing a temperature above said given level proximate one of said power surge detection means sections, to change configuration to connect the conductor associated with said one power surge detection means section to said ground member.

3. The apparatus of claim 1 further comprising a housing within which said first and second power surge detection means sections are situated on opposite sides of said grounding member and means for spring loading said power surge detection means within said housing.

4. The apparatus of claim 3 wherein each of said first and second power surge detection means sections further comprises current sensitive means, said current sensitive means comprising a wire member normally fixed to a member stationary with respect to said housing by a meltable substance, said wire member being moved into contact with said ground member by said spring loading means, upon the melting of said meltable substance.

5. The apparatus of claim 2 wherein said thermal sensitive element is comprised of a nickel/titanium alloy which has a configuration memory.

6. The apparatus of claim 2 wherein each of the transmission line conductors has a contact proximate to said power surge detection means section associated with it and wherein said thermal sensitive element normally has an arcuate configuration with a central portion connected to said ground member and each of two end portions being aligned with, but normally spaced from, a different one of the transmission line conductor contacts associated with each of said power surge detection means sections, said configuration changing in response to a temperature exceeding a given level proximate one of said power surge detection means sections, such that said end portions proximate to said one power surge detection means section moves to abut the transmission line conductor contract associated with said one power surge detection means section.

7. A surge protector device of the type having terminals for connection to communications equipment and to a transmission line respectively and including a circuit providing connections between the communications equipment terminals and the transmission line terminals, said circuit comprising one or more solid state elements providing voltage surge protection between the transmission line terminals and a ground connection, said solid state elements being disposed in a unitary assembly, said assembly comprising first and second line contact members and a ground contact member, said first and second line contact members being disposed on opposite sides of said ground contact member, a thermally sensitive, conductive rod having a middle portion and first and second end portions, said middle portion being secured in intimate thermal and electrical contact with said ground contact, said end portions being located proximate but normally spaced from said line contacts, said rod comprising material having a thermal memory and being effective, upon the generation of excess heat in said assembly, to cause deformation of said rod such that said rod connects both of said transmission line contacts to said ground contact.

8. The device claimed in claim 7 further comprising rod support means and conductive spring means and wherein said unitary assembly is retained in a fixed position relative to the device due to the urging of said springs means acting against respective first portions of said line contacts and in electrical connection therewith, each of said line contacts having a respective second portion extending at an angle to the first portion and being substantially co-planar with said rod support means.

9. The device claimed in claim 8 wherein said ground contact comprises a first portion and a second portion, said rod comprising a middle portion and wherein said first portions of said line contacts are substantially co-planar with said first portion of said ground contact an the device, said spring means urging said ground conductor against said first portion of said ground contact to assist in retaining said unitary assembly in position, and wherein said ground contact second portion is substantially co-planar with the second portions of said line contacts to which said middle portion of said rod is secured, said assembly and said rod being in intimate thermal connection.

10. The device claimed in claim 8 or 9 further comprising first and second grounding elements connected to said line terminals, respectively, first and second means for guiding movement of said grounding elements from a non-grounding position to a grounding position, fusible means acting between each of said guide means and the respective grounding element to maintain the grounding element in its non-grounding position, heating element means connected between each line terminal and a respective communications equipment terminal to heat the fusible means associated with the line terminal in response to current flow between the line terminal and the respective communications equipment terminal, each of said conductive springs being arranged under compression to act between the associated line contact and the grounding element connected to the associated line terminal.

11. The device claimed in claim 10 wherein each grounding element comprises a bobbin carrying a contact member, each heating element means comprises a coil wound on the associated bobbin, each guide means comprises a pin member leading from a line terminal and on which the associated bobbin is slidably guided, and said fusible means comprises solder between the bobbin and the guiding pin.

12. The device claimed in claim 11 comprising a housing including first and second end walls, said line terminals and a ground terminal extending in parallel through one of said end walls of the housing, said unitary assembly being mounted against an opposite one of said end walls, said ground terminal, said conductive springs extending in parallel from said unitary assembly to said bobbins, and a ground connection assembly extending in parallel with said springs from said ground terminal to said ground contact of said assembly.

* * * * *